United States Patent Office 3,019,115
Patented Jan. 30, 1962

3,019,115
SURFACE COLORATION OF PERFLUOROHALO-OLEFIN POLYMERS AND COLORANT COMPOSITION THEREFOR
Herman S. Kaufman, Teaneck, and Fred W. West, Wayne, N.J., assignors to Minnesota Mining and Manufacturing Company, St. Paul, Minn., a corporation of Delaware
No Drawing. Filed July 23, 1958, Ser. No. 750,298
6 Claims. (Cl. 106—32)

This invention relates to a process for applying colorants to polymers of a perfluorohaloolefin. In one aspect this invention relates to a process of applying colorants to the surface of extruded polymers of trifluorochloroethylene, while in a more particular aspect this invention relates to a process of applying a solid, coloring material to the surface of extruded copolymers of trifluorochloroethylene and vinylidene fluoride. In another aspect this invention relates to the production of a colored coated wire. In still another important aspect this invention relates to a colorant composition for coloring perfluorohaloolefin polymers.

Because of their unusual chemical and physical characteristics the fluorine-containing thermoplastic polymers are widely used in numerous industrial applications. Among the most outstanding of the properties of fluorine-containing thermoplastic polymers, such as polymers of trifluorochloroethylene, is chemical inertness. Thus, these polymers may be exposed to a wide variety of oxidizing, and solvent-type reagents, such as fuming nitric acid, and fuels with no apparent effect on the polymer. In addition to their high degree of chemical stability, these polymers possess high thermal stability, excellent electrical properties and may be molded or extruded into various useful items. Such polymers may be extruded onto wire to provide a coating or insulation of particularly useful properties. In many applications it is desirable to color such coating, as in the color coding of hookup wire, and various colorants may be incorporated into the polymer mixture prior to extrusion onto the wire. However, in such a coloring method the colorants of pigments appear uniformly throughout the wire coating and tend to produce undesirable alterations in the physical properties of the coating. Many pigments tend to alter the flow properties of the molten plastic during extrusion, each individual colorant tending to require a different set of extrusion conditions for a given plastic. Furthermore, some pigments degrade the plastic almost to the point of uselessness. When colorants are incorporated into the polymer before extrusion, a polymer loss as well as a loss of time, i.e., in cleaning equipment, occurs when switching from one color to another. Occasionally the residual colorant in the extruder will contaminate or discolor subsequent runs of plastic of another color.

It is an object of this invention to provide a process for coloring perfluorohaloolefin plastics.

Another object of this invention is to provide a method for applying pigments to extruded trifluorochloroethylene plastics.

Still another object of this invention is to provide a process for applying pigments to the surface of extruded wire insulation.

A further object of this invention is to provide a coloring composition for perfluorohaloolefin plastics.

It is also an object of this invention to provide a process for coloring extruded trifluorochloroethylene plastics with a minimum amount of colorant and without altering the physical properties of the plastic.

Another object of this invention is to provide a process of coloring trifluorochloroethylene plastics after the extrusion thereof.

According to this invention, specially formulated colorant compositions comprising a heat and solvent resistant colorant, trichloroethylene, and a polymer of trifluorochloroethylene selected from the group consisting of oils, greases and waxes, are applied to the surface of a perfluorohaloolefin polymer and the colorant is set at a temperature above about 170° C. but below the decomposition temperature of the perfluorohaloolefin polymer being colored. The colorant setting operation can be accomplished simultaneously with the application of the colorant composition, or may be accomplished subsequent to the application step, as is hereinafter described.

Plastics which may be colored by the process of this invention are polymers of perfluorohaloolefins, including both homopolymers and copolymers thereof. Such polymers have been found to display outstanding properties as wire insulation and may be blended or admixed in varying proportions depending on the properties desired in the final coating. The homopolymers of perfluorohaloolefins which may be colored by the process of this invention may be prepared by the polymerization of perfluoroolefins, such as tetrafluoroethylene, and of perfluorochloroolefins such as trifluorochloroethylene, to produce a thermoplastic material. The thermoplastic polymers of trifluorochloroethylene generally have a N.S.T. above about 220° C. Copolymers of perfluorohaloolefins which may be colored by the process of this invention may be prepared by the copolymerization of tetrafluoroethylene, perfluoropropene, and perfluorochloroolefins, such as trifluorochloroethylene, and dichlorodifluoroethylene, with other halogenated olefins containing at least 2 hydrogen atoms per molecule, such as vinyl chloride, vinylidene chloride, vinyl fluoride, vinylidene fluoride, and 1,1-fluorochloroethylene. Particularly suitable for wire coating applications is the copolymer of trifluorochloroethylene and vinylidene fluoride, especially blends of various copolymers of trifluorochloroethylene and vinylidene fluoride. It is a preferred embodiment of this invention to use as a wire coating a mixture of a copolymer of above 90 but less than 100 mol percent of trifluorochloroethylene and less than 10 mol percent of vinylidene fluoride with at least one copolymer of about 20 to about 69 mol percent triflurochloroethylene and about 80 to about 31 mol percent of vinylidene fluoride. Three component blends of these copolymers are particularly desirable.

The liquid or liquefiable polymers of trifluorochloroethylene, which serve as vehicles in the ink of this invention are prepared by polymerization of the monomer trifluorochloroethylene to produce oils, greases and soft waxes. Preferred vehicles are the oils or normally liquid polymers since most marking processes are based on the use of liquid composition. The greases and soft waxes are particularly suited for use in marking processes which require non-liquid compositions and further may be dissolved in solvents where liquid compositions are required. The greases and soft waxes have softening points below 150° C. and preferably below about 100° C. Usually, homopolymers of trifluoroethylene are preferred since they are more readily applied to a wider variety of materials. However, copolymers, in the oil, grease and soft wax range, or trifluorochloroethylene copolymerized with halogenated olefins such as vinyl chloride, vinyl fluoride, vinylidene fluoride, dichlorodifluoroethylene, trifluoroethylene, etc. may also be used as vehicles and their use is within the scope of this invention.

A preferred liquid homopolymer of trifluorochloroethylene is that which is generally known as telomer oil. The telomer oil is prepared by directly telomerizing or polymerizing the monomer trifluorochloroethylene with a catalyst, such as benzoyl peroxide, in the presence of sulfuryl chloride or bromohalomethane as the telogen to produce a substantia!ly saturated telomer oil. The telogen, such as sulfuryl chloride, provides chlorine terminal groups, tends to control telomerization and terminates free radical reaction so that by varying the amount of telogen used, the telomeric material may be obtained in the desired form, that is as an oil, grease or wax which is recovered as the product of the process.

The reaction occurs essentially as shown below:

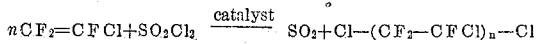

$$nCF_2=CFCl + SO_2Cl_2 \xrightarrow{\text{catalyst}} SO_2 + Cl - (CF_2 - CFCl)_n - Cl$$

As shown, sulfur dioxide gas is formed as well as a clear polymeric mass, usually in gel-like form, which includes various grades of telomeric halocarbons, such as oils, greases and soft waxes. These telomeric halocarbons may be separated by conventional distillation. The distillable, i.e., liquid and liquefiable, substances obtained by telomerizing chlorotrifluoroethylene compounds in the presence of sulfuryl chloride are sufficiently stable as not to absorb appreciable amounts of fluorine even though exposed to the gas for 24 hours at a temperature of 60° C. or to significantly pyrolytically decompose at temperatures up to 200° C. This process may also be used to prepare low molecular weight copolymers or cotelomers of trifluorochloroethylene with halogenated olefins.

The mol ratio of sulfuryl chloride to monomer employed in these procedures is between about 2:1 and about 1:10, preferably between 1:1 and 1:4 depending upon the products desired and the starting materials used. The optimum mol ratio for producing primarily telomeric chlorotrifluoroethylene oils and greases is 1:2 of the telogen to monomer. The telomerization may be carried out in the presence of a suitable inert solvent, if desired. The term inert solvent means any liquid which does not materially alter the normal telomerization of haloethylenic compounds in the presence of sulfuryl chloride; such as Freon 113, tetrachloroethylene or tetrachloroethane. It should be noted that water slowly reacts with sulfuryl chloride to form hydrochloric acid and sulfuric acid and therefore precautions should be taken to provide substantially anhydrous conditions. Glass lined equipment is usually desirable, however Monel and stainless steel have been used for polymerization and filtration apparatus without noticeable corrosion.

The preferred liquid and liquefiable homopolymers of trifluorochloroethylene made with sulfuryl chloride are characterized by the presence in the molecule of an even number of carbon atoms and of chlorine terminal groups. Those liquid homopolymers or telomers, which are suitable to the process of this invention, contain between about 4 and about 15 monomer units in the chain or 8 to 30 carbon atoms. A typical analysis of the preferred liquid homopolymer shows a chlorine content of 31.1% and a fluorine content of 46.2%. The preparation of the above telomer is described in detail in U.S. Patent 2,770,659 of William S. Barnhart, issued November 13, 1956.

Liquid and liquefiable trifluorochloroethylene polymers may also be prepared by other methods, such as by high temperature cracking of a high molecular weight trifluorochloroethylene polymer and stabilizing the resulting unsaturated cracked oil, as shown in U.S. Patent 2,636,907 of Miller, issued April 28, 1953.

There is a difference between the various liquid and liquefiable homopolymers of trifluorochloroethylene depending upon the method by which they are prepared. Thus, while either telomer oil or cracked oil may be used interchangeably in the colorant composition for marking non-fluorinated thermoplastics, such as vinyl chloride, vinylidene chloride, etc. noticeable differences in the quality of the mark were observed with respect to the fluorinated thermoplastics. Generally, the more highly fluorinated plastics were less satisfactorily marked with inks which contained cracked oil as a vehicle.

In the formation of the inks which comprise this invention, any suitable pigment, dye or lake may be employed as the colorant. The term pigment as used herein includes dyes, lakes and inorganic pigments. The pigment may be soluble or insoluble in the vehicle and, if insoluble, is preferably finely-divided and dispersed within the vehicle. Any colored material may be used although, generally, organic compounds are preferred over the inorganic compounds because their colors are more intense and, therefore, less is required. Illustrative of the organic pigments which may be employed are the various phthalocyanine, azo, anthraquinone benzidene and pyrazolone derivatives. A list of particularly suitable pigments is presented below in the table, although it is to be clearly understood that this list is representative and not unnecessarily limiting. These pigments are insoluble in the trichloroethylene and in the vehicle.

TABLE

| | Common name [1] | Reference to structure [1] | Chemical name | General structure |
|---|---|---|---|---|
| 1 | Phthalocyanine blue | Karrer's Organic Chemistry pp. 788-789, 4th Edition. | Copper phthalocyanine | Phthalocyanine pigment. |
| 2 | Phthalocyanine green | do | Chlorinated copper-phthalocyanine | Do. |
| 3 | do | do | Highly chlorinated copper-phthalocyanine | Do. |
| 4 | Benzidine yellow toner | Fig. 49, p. 391 | o-Dichlorobenzidine bis alpha-(azo o-methyl alpha-aceto acetanilide). | Substituted benzidine acetanilide azo pigment. |
| 5 | do | Fig. 48, p. 391 | o-Dichlorobenzidine bis alpha-(azo alpha-acetoacetanilide) | Do. |
| 6 | do | Fig. 50, p. 392 | o-Dichlorobenzidine bis alpha-(azo o-p-dimethyl-alpha-acetoacetanilide). | Do. |
| 7 | Dianisidine orange toner | Fig. 60, p. 397 | o-Dianisidine bis alpha-(azo o-methyl-alpha acetoacetanilide) | Do. |
| 8 | do | Fig. 61, p. 397 | o-Dianisidine bis alpha-(azo o,p-dimethyl alpha-acetoacetanilide). | Do. |
| 9 | do | Fig. 62, p. 398 | o-Dianisidine bis alpha-(azo alpha-acetoacetanilide) | Do. |
| 10 | Lithosal red 2-B | Fig. 91, p. 412 | Calcium salt of 2-hydroxy-3-carboxy-1-naphthyl azo ortho-(p-chloro-m-toluene sulfonic acid). | Phenyl-naphthyl azo pigment. |
| 11 | Benzidine orange toner | Fig. 51, p. 392 | o-Dichlorobenzidine bis 4-(azo-1-phenyl-3-methyl-pyrazolone). | Substituted benzidine-pyrazolone azo pigment. |
| 12 | Vulcan fast red BA | Fig. 81, p. 407 | o-Dichlorobenzidine bis 4-(azo-1-phenyl-3-ethyl carboxylate-pyrazolone). | Do. |
| 13 | Vulcan fast red G | Fig. 80, p. 407 | o-Dianisidine bis 4-(azo-1-p-tolyl-3-methyl-pyrazolone) | Do. |
| 14 | Permanent red F 4RH | Fig. 77, p. 405 | 1-(p-chloro-o-tolyl azo)-2-naphthol 3-amido-n-(p-chloro-o-methyl benzene). | Substituted phenyl-naphthyl-toluidine azo pigment. |
| 15 | Permanent red F 4R | Fig. 76, p. 405 | Ring structure similar to that of pigment (14) | Do. |
| 16 | Chloronitroaniline red toner. | Fig. 75, p. 404 | do | Do. |
| 17 | Nitroaniline red toner | Fig. 73, p. 403 | do | Do. |
| 18 | Toluidine maroon toner | Fig. 82, p. 408 | do | Do. |
| 19 | Nitroanisidine maroon toner. | Fig. 84, p. 409 | do | Do. |
| 20 | Indanthrene blue | Karrer's Organic Chemistry p. 401, 4th Edition. | N-N'-dihydro-1,2,1',2'-dianthraquinone phenazine | Dianthraquinone dye. |
| 21 | Indanthrene orange RRTA. | Fig. 126, p. 430 | | Bromo-anthraquinone dye. |

[1] Unless otherwise indicated, references to structure may be found in J. J. Mattiello, Protective and Decorative Coatings, V. 5 Chapter 4 (John Wiley and Sons, 1946).

Representative of the soluble pigments which may be employed are the various indigo dyes such as Ciba Yellow 3G, Brilliant Indigo 4B, Ciba Green G, Ciba Violet A, Helindon Orange R, etc., the Alizarine dyes such as Alizarine Cyanine Green, Alizarine Blue, Alizarine Orange and the quinoline dyes such as Chinoline Yellow. These dyes are described and methods of preparation are given in Organic Chemistry, Fieser and Fieser, second edition, pages 907, 910–912 and 916–918.

The pigment is dispersed in the vehicle using any of the conventional blending techniques which are employed in the ink and paint industry. Thus, the pigment and the vehicle may be blended in a pebble mill, ball mill or any type colloid mill or the dispersions may be effected by using a three roll paint mill. The concentration of the pigment in the oil will depend on the intensity of the color desired, the desired thickness of the ink mark and on the desired density of the ink preparation. Concentration of the ingredients is also based on the particular marking process which is to be employed, e.g., silk screen, intaglio or stamp. Concentration generally will be between about 1 and about 50% of the pigment in the vehicle, while a preferred concentration is between about 5 and about 20%. Ink concentrates may contain up to about 70% pigment.

The colorant composition of this invention also contains trichloroethylene, which not only serves to regulate viscosity of the composition, but also assists in penetrating the solid polymer surface, permitting more effective deposition of the incorporated colorant or pigment in or below the surface of the solid polymer. The vehicle, i.e., the liquid polymer of trifluorochloroethylene, assisted by the trichloroethylene, apparently either volatilizes or diffuses through the solid polymer, leaving the coloring pigment as a concentrated mass in or below the surface. Although the colorant composition can contain widely varying amounts of trichloroethylene, it usually constitutes 5 to 75 weight percent of the colorant composition, preferably 30 to 50 weight percent. Trichloroethylene is generally added to the colorant-vehicle blend in an amount within the above ranges which depends on the viscosity desired.

The ink composition may be applied to the cold surface of the plastic by any of the conventional printing or marking processes such as flowing, dipping, stamping, etc. The marked plastic is then heated at a temperature between about 170° C. and the decomposition temperature of the plastic, usually between about 170° C. and about 375° C., for a period of time between about one second and about 30 minutes to set the ink. Preferably, the marked plastic is heated at a temperature between about 190° C. and about 200° C. for a period of time between about one and 10 minutes. The trichloroethylene is preferably allowed to evaporate before the heating operation is begun. In the marking of wire coatings rapid surface heating is usually required and thus air or gas temperatures between about 300° C. and about 375° C. may be necessary to set the ink in a short period of time. Any source of heat can be used in the application of these inks such as a hot blast of air or an inert gas, oven heat and infra-red heat.

A preferred embodiment for coloring wire insulation involves the positioning of spray guns about the circumference of the plastic coated wire to deliver trichloroethylene containing colorant composition to the surface of the plastic after it leaves the extrusion die and before quenching. The hot plastic coating being sprayed after it emerges from the die is preferably at a temperature above its transition temperature, usually above 170° C. for perfluorohaloolefin copolymers and above 210° C. for perfluorohaloolefin homopolymers. A frequently used die temperature range is 300° C.–355° C. If the plastic coating is sprayed when below the transition temperature, subsequent heating above such temperature will serve to set the colorant.

In order to illustrate this invention, the following examples are presented. Example 1 is representative of ink formulations which were prepared by dispersing the pigment in the oil in a three-roll paint mill and subsequently adding the trichloroethylene, and which were successfully employed in marking perfluorochloroolefin polymers. These examples are offered for purposes of illustration and are not to be construed as necessarily limiting the invention.

*Example 1*

Ten parts by weight of phthalocyanine green and 80 parts by weight of trifluorochloroethylene telomer oil were dispersed in a three-roll paint mill. Ten parts by weight of trichloroethylene were added to the dispersion. The colorant composition was then spread on an ink pad, and printing was done with rubber stamps on 5 mil polytrifluorochloroethylene film. The printed film was heated for two minutes in an oven set at 190° C. to develop adhesion. The printed mark was stable, did not smudge or crack, was permanent, and did not offset when the surface was reheated.

*Example 2*

Three spray guns (Paasche multihead air brush, type AURTF with #1 needle air cap) were set at 120 degree intervals around the circumference of the plastic coated wire emerging from an extrusion die, to deliver a colorant composition to the plastic coating. The spray nozzles were positioned at such a distance from the moving wire as to permit some overlapping of the spray patterns of each nozzle, thereby to insure uniform circumferential distribution of the colorant composition. Low colorant cost eliminated the need for reusing the overspray, and recovery of the overspray was not therefore attempted. The coloring operation was carried out at wire speeds of 110 to 180 feet per minute, but speeds in excess of 200 feet per minute, such as 250 feet per minute, have also been used. Wire used was #22 AWG 7/30 silver plated copper conductor, and the colorant composition used was as in Example 1. The temperature of the extrusion die was approximately 640° F. The plastic coating consisted of a blend of trifluorochloroethylene-vinylidene fluoride copolymers and included those with respective monomer mol ratios of 96/4, 75/25, and 50/50 in a copolymer weight ratio of 90/7:3 respectively. After the colorant composition was sprayed on the surface of the hot plastic coating, the coated wire was quenched. The colored wire thus produced was stable, did not smudge or crack, and the coloring was permanent.

Other colorant compositions within the scope of the above disclosure similarly produced a colored wire coating with the same outstanding properties.

It is also within the scope of this invention to apply the coloring composition to the hot plastic by any of the methods known to the art, such as by spraying, flowing, by use of an enclosed colorant bath, etc. Other modifications and changes will become apparent to those skilled in the art, and the matter contained in the above description is to be interpreted as illustrative only.

We claim:

1. In a process for coloring the surface of perfluorohaloolefinic polymeric material the improvement which comprises applying to said surface a colorant composition consisting essentially of between about 1 and about 50 weight percent of a colorant, between about 5 and about 75 weight percent of trichloroethylene, and a low molecular weight trifluorochloroethylene polymer having a softening point below 150° C., and setting said colorant at a temperature above about 170° C. and below the decomposition temperature of the polymer being colored for a period of between about one second and about thirty minutes.

2. The process of claim 1 in which the low molecular weight trifluorochloroethylene polymer ranges in physical properties from an oil to a grease and wax.

3. The process of claim 1 in which the temperature of setting is between about 170° C. and about 375° C.

4. The process of claim 1 in which the perfluorohaloolefin polymeric material comprises at least one copolymer of trifluorochloroethylene and vinylidene fluoride.

5. A colorant composition consisting essentially of a trifluorochloroethylene polymer having a softening point below about 150° C., between about 1 and about 70 weight percent of a colorant, and between about 5 and about 75 weight percent of trichloroethylene.

6. The colorant composition of claim 5 in which the trifluorochloroethylene polymer is a liquid.

References Cited in the file of this patent

UNITED STATES PATENTS

| | | |
|---|---|---|
| 2,393,967 | Brubaker | Feb. 5, 1946 |
| 2,635,093 | Miller | Apr. 14, 1953 |
| 2,706,715 | Conner | Apr. 19, 1955 |
| 2,751,376 | Barnhart et al. | June 19, 1956 |
| 2,773,781 | Rodman | Dec. 11, 1956 |
| 2,774,704 | Smith | Dec. 18, 1956 |
| 2,774,705 | Smith | Dec. 18, 1956 |
| 2,803,729 | Kohring | Aug. 20, 1957 |
| 2,823,146 | Roberts et al. | Feb. 11, 1958 |

FOREIGN PATENTS

| | | |
|---|---|---|
| 766,257 | Great Britain | July 8, 1954 |

OTHER REFERENCES

The Condensed Chemical Dictionary, 4th edition, 1950, page 571.